United States Patent [19]
Kienle

[11] Patent Number: 5,398,908
[45] Date of Patent: Mar. 21, 1995

[54] CONTAINER FOR RECEIPT OF AN EDIBLE GOOD

[75] Inventor: Erich Kienle, Emmen, Switzerland

[73] Assignee: Zentralschweizerischer Milchverband (MVL), Luzern, Switzerland

[21] Appl. No.: 972,312

[22] Filed: Nov. 5, 1992

[30] Foreign Application Priority Data

Nov. 14, 1991 [CH] Switzerland .......... 3321/91

[51] Int. Cl.⁶ .................................. B28B 7/24
[52] U.S. Cl. .................................. 249/121; 249/119; 249/127; 249/139; 249/140; 206/471; 220/208; 220/658; 220/376; 426/394
[58] Field of Search ............ 426/392, 394, 106, 112, 426/397, 130, 414, 515; 220/208, 213, 376, 658; 206/471; 249/119, 121, 127, 139, 140

[56] References Cited

U.S. PATENT DOCUMENTS

| | | | |
|---|---|---|---|
| 2,591,261 | 9/1952 | Holohan | 249/140 |
| 3,666,088 | 5/1972 | Wingardh | 426/130 |
| 3,680,828 | 8/1972 | Swett | 249/121 |
| 3,799,493 | 3/1974 | Beck et al. | 249/121 |
| 3,921,801 | 11/1975 | Sway | 249/121 |
| 4,372,526 | 2/1983 | Daenen et al. | 249/119 |
| 4,388,334 | 6/1983 | Deveaux | 426/515 |
| 4,990,345 | 2/1991 | Webb | 426/112 |

*Primary Examiner*—Robert A. Dawson
*Assistant Examiner*—Ana M. Fortuna
*Attorney, Agent, or Firm*—Laff, Whitesel, Conte & Saret

[57] ABSTRACT

The closure lid is designed as mold on the container body. The volume enclosed by the closure lid and the container body equals at least approximately the volume of the product filled into the container. The edible good is placed in a flowable state into the container body. Thereafter the closure lid which is recessed relative to the upper edge of the container is placed onto the container body and molds the surface of the filled in edible good to attain a predetermined structure. Upon a cooling the edible good attains a solid state in such a manner, that its surface keeps permanently the shape produced by the closure lid.

5 Claims, 1 Drawing Sheet

5,398,908

CONTAINER FOR RECEIPT OF AN EDIBLE GOOD

BACKGROUND OF THE INVENTION

1. Field of the Invention

The present invention relates to a container adapted for receipt of a predetermined volume of an edible good of the kind which during its production changes its consistency from an initially flowable state to a final solid state, which container includes a container body having a bottom, a sidewall member and a closure lid, and which edible good is of a kind which is to be eaten by aid of a spoon-like utensil directly out of the container.

The invention relates also to a method of shaping by a molding an edible good filled into a container of the kind which during its production changes its consistency from an initially flowable state to a final solid state, which container includes a container body having a bottom, a sidewall member and a closure lid, and which edible good is of a kind which is to be eaten by aid of a spoon-like utensil directly out of the container, which closure lid is designed as mold for the edible good and is adapted to produce at the upper surface of the edible good filled into the container body a permanently structured shape of its upper surface when the container has been opened by a removing of the closure lid.

2. Description of the Prior Art

The edible goods of the kind here referred to are for instance such goods which when heated are of a flowable consistency and after a cooling change into a solid consistency, such goods which gel during the cooling off, such as brine, jelly, gelatine, pudding, dairy products, etc.

The containers which have a structured bottom which produces an ornamental shaping of the corresponding surface of an edible good filled into the container are generally known. In order, however, to eat such goods the container must be overturned, i.e. in order to render the shape given to such edible good in the container visible it must be removed out of the container. In case of goods of a rather small volume such as desserts this removing is a cumbersome procedure which specifically cannot be accomplished by children or then only imperfectly or in a faulty manner such that e.g. a pudding is eaten directly out of the container body, wherewith a figure molded at the bottom of the pudding will never get visible.

SUMMARY OF THE INVENTION

Hence, it is a general object of the present invention to provide a container for receipt of edible goods which can directly be eaten out of the container and of which the structured form of the free surface is visible immediately after the closure lid has been removed.

A further object is to provide a method of shaping by a molding an edible good filled into a container which can be directly eaten out of the container and of which the structured surface is visible immediately after the cover lid has been removed from the container.

Yet a further object is to provide a container, of which the closure lid is designed as mold for the edible good and is adapted to produce at the upper surface of the edible good filled into the container body a permanently structured shape of its upper surface when the container has been opened by a removing of the closure lid.

A further object is to provide a method of shaping by a molding an edible good filled into a container comprising the steps of filling the edible good in a flowable state into the container body, of placing the closure lid onto the container body before the edible good has assumed its solid state, and of rotating the container in order to have the filled in flowable edible good contacting the closure lid, whereby the closure lid produces the predetermined structured shape of the surface of the edible good, which structured shape is maintained after the edible good has assumed its solid state.

BRIEF DESCRIPTION OF THE DRAWINGS

The invention will be better understood and objects other than those set forth above will become apparent when consideration is given to the following detailed description thereof. Such description makes reference to the annexed drawings, wherein.

DESCRIPTION OF THE PREFERRED EMBODIMENT

Figure 1:
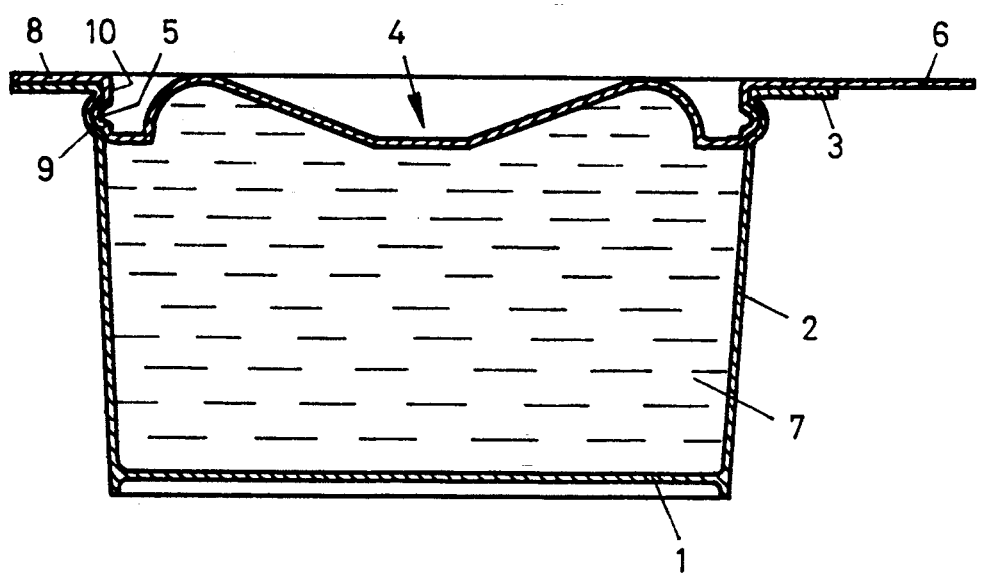
FIG. 1 is a vertical section through a container.
Figure 2:
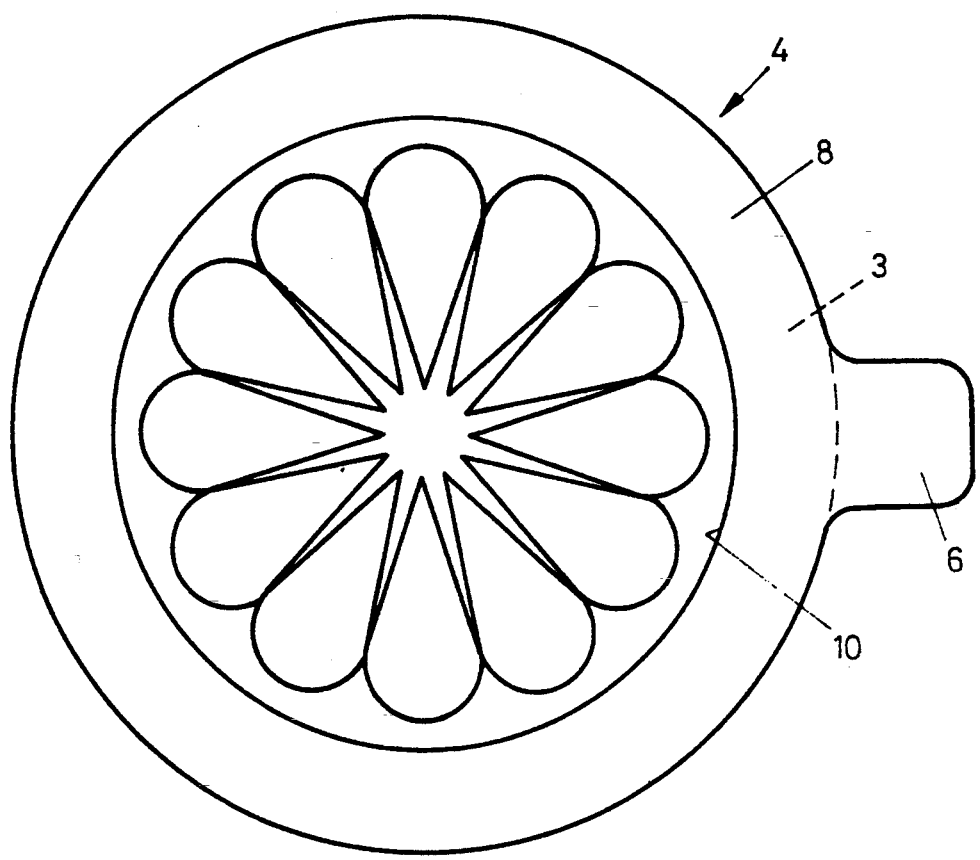
FIG. 2 is a top view of the container of FIG. 1.

The container illustrated in the drawings includes a container body having a bottom 1, a sidewall member 2 and a circumferential rim 3 projecting laterally from the sidewall member 2. The particular container of this embodiment is of a circular shape; it may, however, have any other shape, for instance a square shape.

The container body is closed by a closure lid 4 in a sealed manner. The closure lid 4 includes a circumferential rim portion 8 and a tear open tab 6 located projecting from the circumferential rim portion 8. A sidewall portion 10 of the closure lid 4 extends from the radially inner end of the circumferential rim 8 of the closure lid 4 downwards along an area of the sidewall member 2 of the container body.

This sidewall portion 10 is designed with a circumferential bead 5 which projects into an inner circumferential groove 9 formed in the sidewall member 2. This structure forms a sealed snap-on closure. In place of this particular embodiment also other generally known designs for a sealing, a hot sealing and a locking between the closure lid 4 consisting of a plastics material and the container body are foreseen. It also is possible, according to further embodiments, to have a tear-open connection between the circumferential rim 8 of the closure lid 4 and the circumferential rim 3 of the container body.

Due to mentioned sidewall portion 10 of the closure lid 4 extending downwards in the direction of the inner space of the container body the bottom of the closure lid 4 or at least areas thereof are located recessed towards the inner space of the container body.

That portion of the closure lid 4 which directly covers the inner space of the container body is not of a planar nature. It is rather designed in a structured manner such as illustrated on an exemplary basis in the figures, wherewith it forms a mold for the edible good filled into the container body.

Although the figures illustrate a purely geometric shape formed in the closure lid, other or further, respectively, shapes are foreseen, e.g. figures which appeal to children, animals, comic-figures, ciphers, letters, etc.

It shall now be assumed, that the edible good is a pudding. It is generally known, that such a pudding is produced at an elevated temperature, at which the mass of the pudding is liquid, i.e. in a flowable state. A certain amount or volume, respectively, of this flowable mass is now filled into the container body, which volume corresponds at least approximately to the volume enclosed by the container body 1, 2, 3 and the closure lid 4 set onto the container body.

After this flowable mass has been filled into the container body and accordingly is still in a flowable state due to the elevated temperature, the closure lid 4 is placed onto the container body and thereafter the complete container is rotated by 180°, i.e. turned upside down, and accordingly the product which still is in a flowable state flows into the shape determining, i.e. molding portions of the closure lid and assumes there the corresponding shape. Thus, after the edible good has been poured into the container body and the closure lid 4 has been placed thereupon, the complete container is turned upside down.

Thereafter the accordingly filled container including the closure lid placed thereupon is led to cool off, whereby now the contents assume a solid state, referring to the particular example described herein, the goods filled into the container gel to pudding and its surface comprises now the structural shape which has been molded thereinto.

If now the closure lid 4 is removed for eating the pudding, the visible surface of the pudding includes the molded form or shape, respectively, and the pudding can be eaten directly out of the container body.

It is a generally known and oftentimes annoying fact that when such an edible good is removed from the container by a turning over of the container, parts of the contents of the container do not separate from the bottom and rather remain adhering thereon and accordingly are torn away from the main body of the product such as pudding. A common reason of this occurrence is that no air can penetrate between the inner wall of the container and its contents.

Because the pudding is not a completely rigid but rather a somewhat limp mass, it can move somewhat specifically at the area of the closure lid. This moving can proceed laterally as well as vertically. Specifically when the container is stored over a certain length of time, gravity forces act onto the contents of the container such that specifically the upper surface of the product filled thereinto is inclined to sag somewhat. This sagging allows now that air which already previously has been present in the product still in its flowable state can albeit only in minute amounts penetrate into the area between the surface of the pudding and the lower side of the closure lid such that specifically at this critical area an easy separating of the pudding from the closure lid may occur, if at all.

While there is shown and described a present preferred embodiment of the invention, it is to be distinctly understood that the invention is not limited thereto, but may be otherwise variously embodied and practiced within the scope of the following claims.

I claim:

1. A disposable container adapted for containing an edible food eaten with a spoon directly from the container, said edible food changes its consistency from an initially flowable state to a final solid state, said container comprising:

an unitary body having a bottom and a sidewall defining an open top end, a closure lid attached to said container body to close said open top, said closure lid having an inner surface constructed as mold for the edible food to produce a decorative permanently structured shape on an upper surface of said edible food, wherein when the closure lid is removed from said container said decorative structure shape is visible.

2. The container of claim 1 said inner closure lid surface and said container body define an inner container volume, said inner container volume being equal to at least approximately the volume of the edible food in the container wherein the edible food in its flowable state contacts the inner surface of the closure lid attached to the container body wherein the top surface of the edible food in said closed container forms the permanently structured shape when said edible food reaches a solid state.

3. The container of claim 1 wherein said closure lid has bulged areas that project in a direction towards the container bottom when said cover lid is attached to said container body.

4. The container of claim 1 wherein the closure lid has a circumferential rim portion and the side wall member has circumferential rim portion defining said open top end wherein the circumferential rim portion of the closure lid when attached to the container body contacts the circumferential rim portion of the side wall member and the closure lid and the side wall have cooperating snap-on means positioned below said side wall circumferential rim.

5. The container of claim 4 wherein said snap on means is a circumferential bead formed on a portion of said closure lid below said closure lid circumferential rim and a circumferential groove formed in said container side wall below said sidewall circumferential rim.

* * * * *